(12) United States Patent
Zhang et al.

(10) Patent No.: US 9,609,597 B2
(45) Date of Patent: Mar. 28, 2017

(54) NETWORK CONNECTION PROCESSING METHOD AFTER WAKENING OF TERMINAL IN STANDBY, AP AND BP

(75) Inventors: Xiaowei Zhang, Shenzhen (CN); Gang Tao, Shenzhen (CN); Hongli Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 171 days.

(21) Appl. No.: 14/403,210

(22) PCT Filed: Jun. 11, 2012

(86) PCT No.: PCT/CN2012/076688
§ 371 (c)(1),
(2), (4) Date: Nov. 24, 2014

(87) PCT Pub. No.: WO2013/135009
PCT Pub. Date: Sep. 19, 2013

(65) Prior Publication Data
US 2015/0109980 A1    Apr. 23, 2015

(30) Foreign Application Priority Data
Mar. 13, 2012  (CN) .......................... 2012 1 0064747

(51) Int. Cl.
G08C 17/00   (2006.01)
H04W 52/02   (2009.01)
H04W 76/02   (2009.01)

(52) U.S. Cl.
CPC ..... H04W 52/0235 (2013.01); H04W 52/028 (2013.01); H04W 52/0251 (2013.01); H04W 76/02 (2013.01); Y02B 60/50 (2013.01)

(58) Field of Classification Search
CPC .................................................. H04W 52/02
See application file for complete search history.

(56) References Cited

U.S. PATENT DOCUMENTS 7,454,634 B1    11/2008  Donovan et al.
2003/0013477 A1*  1/2003  McAlinden ....... H04M 1/72522
                                                    455/550.1
(Continued)

FOREIGN PATENT DOCUMENTS

CN    1672448 A    9/2005
CN    101091398 A  12/2007
(Continued)

OTHER PUBLICATIONS

International Search Report for PCT/CN2012/076688 dated Dec. 1, 2012.

Primary Examiner — Chi H Pham
Assistant Examiner — Fahmida Chowdhury
(74) Attorney, Agent, or Firm — Ling Wu; Stephen Yang; Ling and Yang Intellectual Property

(57) ABSTRACT

The method is used in the AP, including: the AP suspending a high-speed bus directly when the terminal enters a standby state; the AP resuming the high-speed bus and inquiring a network connection state of the BP when the terminal is wakened; and if connection, the AP continuing to use a wireless data link, otherwise, the BP re-establishing a wireless data link. The method is used in the BP, including: the BP entering a standby state directly when the BP detects that a high-speed bus is suspended; the BP entering a wakening state after detecting that the high-speed bus is resumed, inquiring and feeding back a network connection state of the BP to the AP after receiving an instruction of inquiring the networking state of the AP; re-establishing a wireless data link or maintaining a wireless data link of a current networking after receiving a networking instruction of the AP.

12 Claims, 3 Drawing Sheets

(56) References Cited

U.S. PATENT DOCUMENTS

| | | | |
|---|---|---|---|
| 2009/0073871 A1* | 3/2009 | Ko | H04W 52/0229 370/216 |
| 2010/0191995 A1 | 7/2010 | Levy et al. | |
| 2011/0273309 A1 | 11/2011 | Zhang et al. | |
| 2013/0016632 A1* | 1/2013 | Mujtaba | H04B 7/0608 370/275 |
| 2013/0190032 A1* | 7/2013 | Li | H04L 67/28 455/517 |

FOREIGN PATENT DOCUMENTS

| | | |
|---|---|---|
| CN | 101242447 A | 8/2008 |
| EP | 1920801 A2 | 5/2008 |

\* cited by examiner

NETWORK CONNECTION PROCESSING METHOD AFTER WAKENING OF TERMINAL IN STANDBY, AP AND BP

TECHNICAL FIELD

The present document relates to the mobile communication field, and in particular, to a network connection processing method after wakening a terminal on standby and an application processor (abbreviated as AP) and a baseband processor (abbreviated as BP) in the terminal.

BACKGROUND OF THE RELATED ART

With the popularization of the 3G network, the mobile broadband products represented by iPAD are developed rapidly. On the basis of the positioning of the intellectual products, the PAD type products (palmtop computer) on the hardware framework usually adopt the framework of AP+BP, wherein, the intelligent operating system is running on the AP, and the BP is a 3G baseband chip, and the two are connected through the high-speed bus (such as, the USB bus) therebetween.

Since most of the PAD type adopts the battery powered mode, in consideration of the endurance capability, it usually has a standby state, in order to reduce the power consumption. In order to reduce the overall power consumption during the standby period as much as possible, the conventional method is to power off the BP system during the standby period; and to power on the BP again when the complete machine is wakened up. This method leads to the fact that the BP needs to re-search the network and perform the data dialing after powering on, and then it could surf the internet, and this process usually takes a range from dozens of seconds to several minutes. That is to say, the users need to wait for a long time and then are able to perform the Internet interaction action after the complete machine is wakened up from standby, and the user experience is very bad.

In order to keep the connection with the network during the period that the complete machine is on standby, some PAD products adopt the method of sending a "breathing packet" to the network regularly. Although this method guarantees that the machine can interact with the Internet immediately after wakening up and guarantees good user experience, however, in fact the BP needs to send the "breathing packet" to the network regularly, thus the BP is not really on standby, and the power consumption of the PAD is still greater. In addition, the "breathing packet" is invalid data to users, however, the users still need to pay the bill for this part of invalid data.

In sum, in the related art, there are two problems for processing the network connection after wakening the PAD type communication products on standby:

1, the host computer cannot keep the networking state under the standby state, and it can only reconnect passively after wakened up;

2, the host computer can keep the networking state under "standby state", but it needs the BP to send the "breathing packet" constantly, which cannot realize the real standby, and the energy consumption of the machine is also very big.

SUMMARY OF THE INVENTION

The technical problem that the present document requires to solve is to provide a network connection processing method after wakening a terminal on standby, AP, BP and terminal, so that the standby power consumption is reduced and the network connection is immediately available after the standby machine is wakened up.

In order to solve the above-mentioned technical problem, the present document provides a network connection processing method after wakening a terminal on standby, used in an application processor (AP) of the terminal, comprising:

the AP suspending a high-speed bus directly when the terminal will enter a standby state;

the AP resuming the high-speed bus and inquiring a network connection state of a baseband processor (BP) of the terminal when the terminal is wakened; and if the network connection state of the BP is connection, then the AP continuing to use a wireless data link, otherwise, the BP re-establishing a wireless data link.

Preferably, said inquiring the network connection state of the BP comprises:

the AP sending an instruction of inquiring the networking state to the BP to obtain the network connection state of the BP.

Preferably, the AP makes the BP re-establish the wireless data link, comprising:

the AP sending a networking instruction to the BP, so that the BP re-establishes the wireless data link according to a current network state of the BP.

In order to solve the above-mentioned technical problem, the present document further provides a network connection processing method after wakening a terminal on standby, used in a baseband processor (BP) of the terminal, comprising:

the BP entering a standby state directly when the BP detects that a high-speed bus is suspended;

the BP entering a wakening state after the BP detects that the high-speed bus is resumed, and inquiring a network connection state of the BP after receiving an instruction of inquiring the networking state of an application processor (AP) of the terminal, and feeding back the network connection state of the BP to the AP; and the BP re-establishing a wireless data link or maintaining a wireless data link of a current networking after receiving the networking instruction of the AP.

Preferably, the BP re-establishes the wireless data link after receiving the networking instruction of the AP, comprising:

the BP re-establishing the wireless data link according to a current network state of the BP after receiving the networking instruction of the AP.

In order to solve the above-mentioned technical problem, the present document further provides an application processor (AP) in a terminal, comprising:

an application program control module, configured to: send a standby instruction to a high-speed bus host module when the terminal will enter a standby state, and send a resuming instruction to the high-speed bus host module when the terminal is wakened; inquire a network connection state of a baseband processor (BP) of the terminal; and if the network connection state of the BP is connection, then continue to use a wireless data link, otherwise, make the BP re-establish a wireless data link;

the high-speed bus host module is configured to: suspend the high-speed bus after receiving the standby instruction; and resume the high-speed bus after receiving the resuming instruction.

Preferably, the application program control module is configured to: inquire the network connection state of the BP, comprising: sending an instruction of inquiring the networking state to the BP to obtain the network connection state of the BP.

Preferably, the application program control module is configured to: make the BP re-establish the wireless data link, comprising: sending a networking instruction to the BP, so that the BP re-establishes the wireless data link according to a current network state of the BP.

In order to solve the above-mentioned technical problem, the present document further provides a baseband processor (BP) in a terminal, comprising:

a high-speed bus device module, configured to: send a standby instruction to a standby control module after detecting that a high-speed bus is suspended; and send a resuming instruction to the standby control module after detecting that the high-speed bus is resumed;

the standby control module, configured to: control the BP to enter a standby state after receiving the standby instruction; and control the BP to enter a wakening state after receiving the resuming instruction;

a networking control module, configured to: inquire a network connection state of the BP after receiving an instruction of inquiring the networking state of an application processor (AP) of the terminal, and feed back the network connection state of the BP to the AP; and re-establish a wireless data link or maintaining a wireless data link of a current networking after receiving the networking instruction of the AP.

Preferably, the networking control module is configured to: re-establish the wireless data link after receiving the networking instruction of the AP, comprising: re-establishing the wireless data link according to a current network state of the BP after receiving the networking instruction of the AP.

In order to solve the above-mentioned technical problem, the present document further provides a terminal, comprising an application processor (AP) described as above and a baseband processor (BP) described as above.

Compared with the related art, for the network connection processing method after wakening the terminal on standby and the terminal provided in the embodiment of the present document, it is not required to send the data packet to the network ceaselessly during the standby period, which saves the flow rate of the user data, reduces the standby power consumption and improves the standby time of the complete machine; at the moment of wakening up, it detects the connection state of the network voluntarily, and once it finds that the connection is disconnected, it immediately connects to the network again before the standby; in this way, it guarantees the user experience that the network connection is available and not disconnected under the standby state, and reaches the effect that the network connection is immediately available after the complete machine is wakened up.

PREFERRED EMBODIMENTS OF THE PRESENT DOCUMENT

In order to make the objective, technical scheme and advantage of the present document more clear and obvious, the embodiment of the present document is described in detail with reference to the accompanying drawings hereinafter. It should be illustrated that, in the case of not conflicting, the embodiments in the present application and features in these embodiments can be combined with each other at random.

EMBODIMENT

Figure 1:
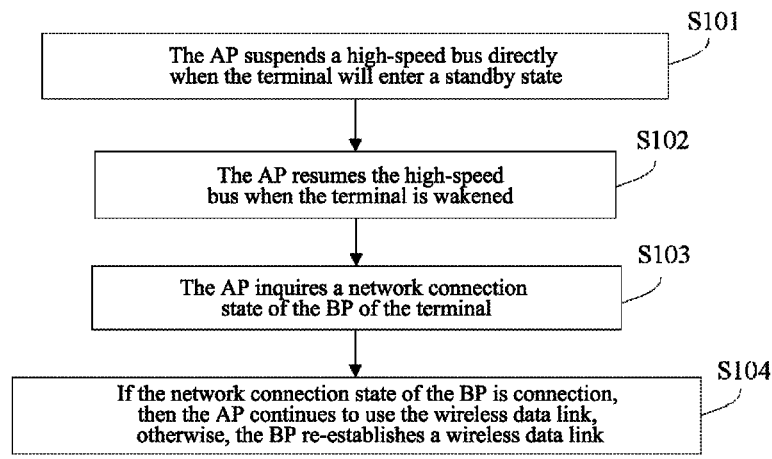
FIG. 1 is a flow chart of a network connection processing method after wakening a terminal on standby used in an application processor (AP) of the terminal in an embodiment.

As shown in FIG. 1, the present embodiment provides a network connection processing method after wakening a terminal on standby, used in the AP of the terminal, including the following steps.

In S101, the AP suspends a high-speed bus directly when the terminal will enter a standby state.

Here, when the terminal will enter the standby state, the AP does not send an offline instruction to the baseband processor (BP) of the terminal, but to suspend the high-speed bus (such as, a USB bus) directly.

In S102, the AP resumes the high-speed bus when the terminal is wakened.

In S103, the AP inquires a network connection state of the BP of the terminal.

Wherein, the AP sends an instruction of inquiring the networking state to the BP to obtain the network connection state of the BP.

In S104, if the network connection state of the BP is connection, then the AP continues to use a wireless data link, otherwise, the BP re-establishes a wireless data link.

Wherein, if the network connection state of the BP is disconnection, then the AP sends a networking instruction to the BP, so that the BP re-establishes the wireless data link according to a current network state of the BP.

Wherein, when the BP re-establishes the data link, the terminal needs to re-detect a registration state of a current PS field, but it does not need to re-search the network.

Figure 2:
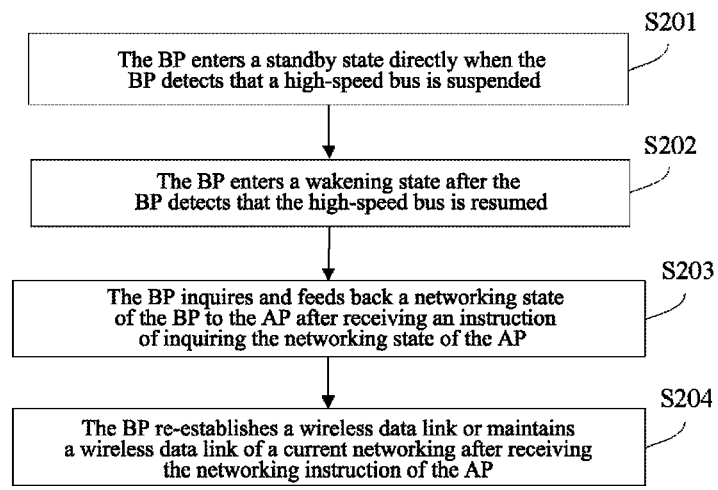
FIG. 2 is a flow chart of a network connection processing method after wakening a terminal on standby used in a baseband processor (BP) of the terminal in an embodiment.

As shown in FIG. 2, the present embodiment provides a network connection processing method after wakening a terminal on standby, used in the BP of the terminal, including the following steps.

In S201, the BP enters a standby state directly when the BP detects that a high-speed bus is suspended.

Wherein, after the BP detects that the high-speed bus is suspended, and the BP enters the standby state directly without notifying the network; during the standby process, the BP in the present embodiment does not send a "breathing packet" to the network side.

In S202, the BP enters a wakening state after the BP detects that the high-speed bus is resumed.

In S203, the BP inquires a network connection state of the BP and feeds back the network connection state of the BP to the AP after receiving an instruction of inquiring the networking state of the AP.

In S204, the BP re-establishes a wireless data link or maintains a wireless data link of a current networking after receiving the networking instruction of the AP.

Wherein, if the network connection state fed back by the BP to the AP is connection, then the BP maintains a wireless data link of a current networking; if the network connection state fed back by the BP to the AP is disconnection, the BP will receive the networking instruction of the AP, and then, the BP re-establishes the wireless data link according to its current network state.

Wherein, when the data link is re-established, the terminal needs to re-detect the registration state of the current PS field, but it does not need to re-search the network.

Figure 3:
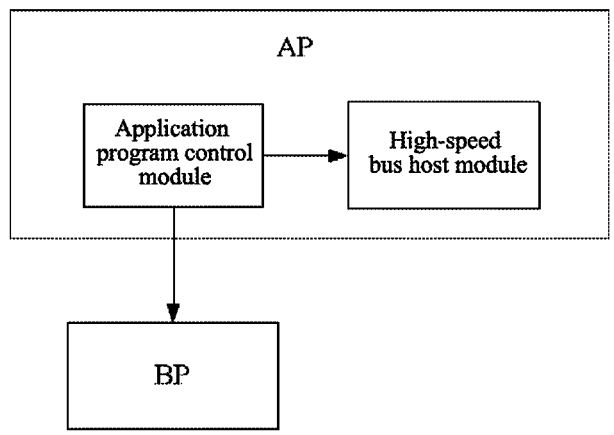
FIG. 3 is a structure diagram of an application processor (AP) in a terminal in an embodiment.

As shown in FIG. 3, the present embodiment provides an application processor (AP) in a terminal, including:

an application program control module, configured to: send a standby instruction to a high-speed bus host module when the terminal will enter a standby state, and send a resuming instruction to the high-speed bus host module when the terminal is wakened; inquire a network connection state of a baseband processor (BP) of the terminal; and if the network connection state of the BP is connection, then continue to use a wireless data link, otherwise, make the BP re-establish a wireless data link;

wherein, the application program control module is further configured to: send an instruction of inquiring the networking state to the BP to obtain the network connection state of the BP.

The application program control module is further configured to: send a networking instruction to the BP, so that the BP re-establishes the wireless data link according to a current network state of the BP. Wherein, when the BP re-establishes the data link, the terminal needs to re-detect a registration state of a current PS field, but it does not need to re-search the network.

The high-speed bus host module is configured to: suspend the high-speed bus after receiving the standby instruction; and resume the high-speed bus after receiving the resuming instruction.

Figure 4:
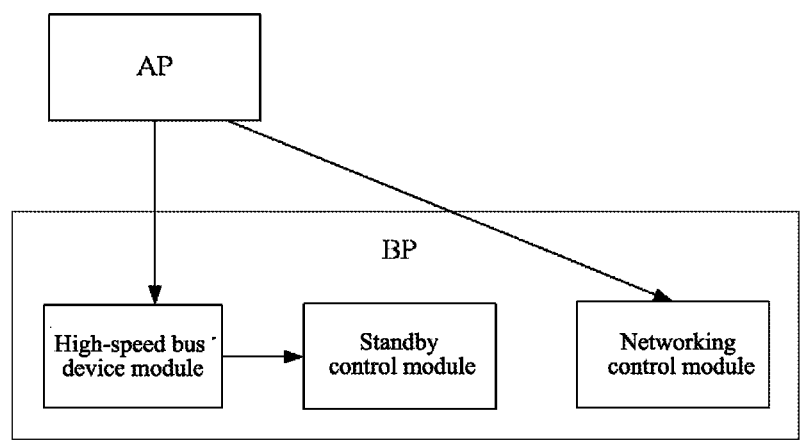
FIG. 4 is a structure diagram of a baseband processor (BP) in a terminal in an embodiment.

As shown in FIG. 4, the present embodiment provides a baseband processor (BP) in a terminal, including:

a high-speed bus device module, configured to: send a standby instruction to a standby control module after detecting that a high-speed bus is suspended; and send a resuming instruction to the standby control module after detecting that the high-speed bus is resumed;

the standby control module, configured to: control the BP to enter a standby state after receiving the standby instruction; and control the BP to enter a wakening state after receiving the resuming instruction; and a networking control module, configured to: inquire a network connection state of the BP and feed back the network connection state of the BP to the AP after receiving an instruction of inquiring the networking state of an application processor (AP) of the terminal; and re-establish a wireless data link or maintaining a wireless data link of a current networking after receiving the networking instruction of the AP.

Wherein, the networking control module is configured to: re-establish the wireless data link according to a current network state of the BP after receiving the networking instruction of the AP. Wherein, when the networking control module re-establishes the data link, the terminal needs to re-detect a registration state of a current PS field, but it does not need to re-search the network.

The present embodiment further provides a terminal including the above-mentioned AP and the above-mentioned BP.

Figure 5:
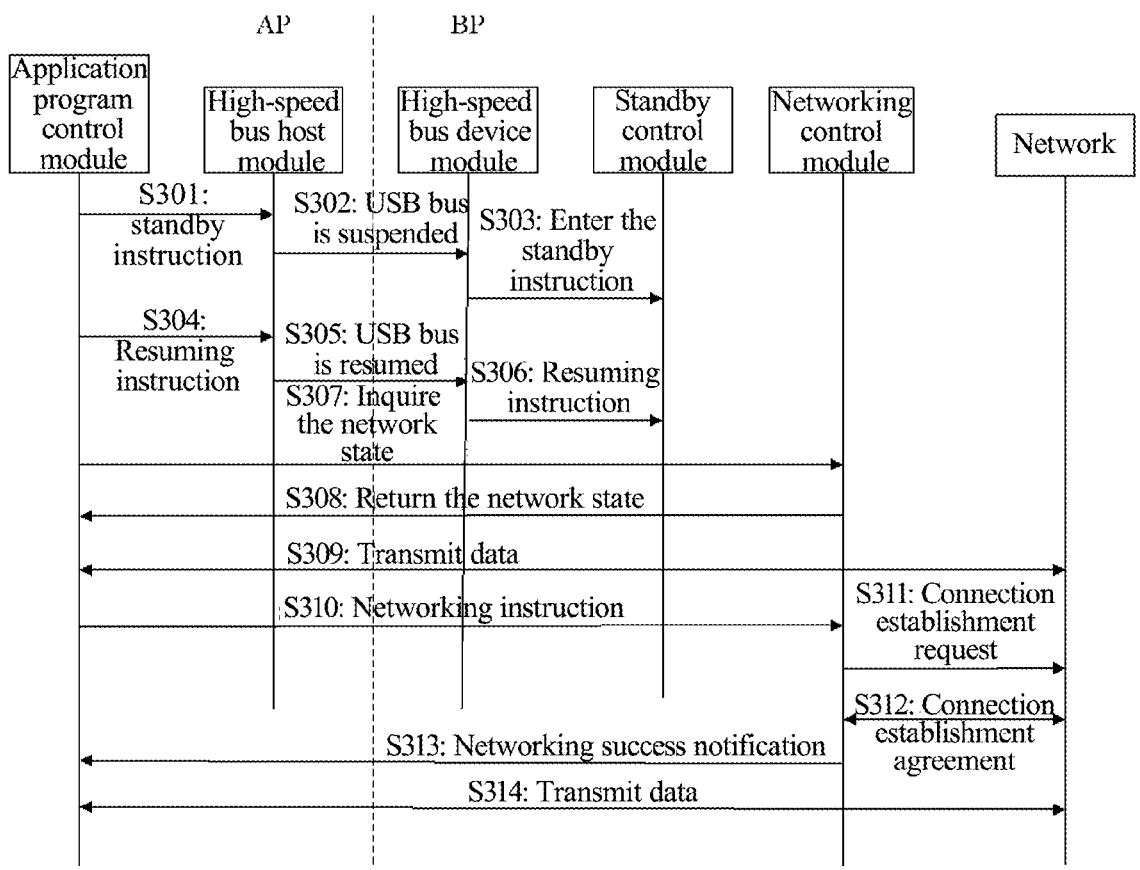
FIG. 5 is a flow chart of a network connection processing method after wakening a terminal on standby in an embodiment.

In an application example, as shown in FIG. 5, the network connection processing method after wakening a terminal on standby includes the following steps.

In S301, when the complete machine needs to enter the standby state, the application program control module sends the standby instruction to the high-speed bus host module.

In S302, after the high-speed bus host module receives the standby instruction from the application program control module, it suspends the high-speed bus (such as the USB bus).

In S303, after the high-speed bus device module detects that the USB bus is suspended, it sends the standby instruction to the standby control module, and the standby control module controls the BP to enter the standby state.

The complete machine enters the standby state at this moment.

In S304, when the complete machine needs to be wakened, the application program control module sends the resuming instruction to the high-speed bus host module.

In S305, after the high-speed bus host module receives the resuming instruction from the application program control module, it resumes the USB bus.

In S306, the high-speed bus device module detects that the USB bus is resumed, it sends the resuming instruction to the standby control module, and the standby control module controls the BP to enter the wakening state.

In S307, the application program control module sends the instruction of inquiring the networking state to the networking control module.

In S308, the networking control module feeds back the network connection state maintained by the BP currently to the application program control module.

In S309, if the network connection before the standby can still be used, then the application program control module continues to use the existing network connection to transmit data; otherwise, the step S310 is executed.

In S310, if the network connection before the standby is not available yet, then the application program control module sends the networking instruction to the networking control module.

In S311, after the networking control module receives the networking instruction, the networking control module sends a connection establishment request to the network.

In S312, the networking control module and the network agree to establish the wireless connections therebetween.

In S313, after the networking control module re-establishes the connection successfully, it notifies the application program control module that a new network connection has already been established successfully.

In S314: the application program control module uses the newly established network connection to transmit data.

In steps S311~S314, when the data link is re-established again, the terminal needs to re-detect the registration state of the current PS field, but it does not need to re-search the network. So far, the terminal can establish the connection with the network quickly to transmit data after wakened from the standby state.

It can be seen from the above-mentioned embodiment, compared with the related art, for the network connection processing method after wakening the terminal on standby and the terminal provided in the above-mentioned embodiment, it is not required to send the data packet to the network ceaselessly during the standby period, which saves the flow rate of the user data, reduces the standby power consumption, and improves the standby time of the complete machine; at the moment of wakening up, it detects the connection state of the network voluntarily, and once it finds that the connection is disconnected, it immediately connects to the network before the standby again; in this way, it guarantees the user experience that the network connection is available and not disconnected under the standby state and reaches the effect that the network connection is immediately available after the complete machine is wakened up.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above description is only the preferred embodiments of the present document and is not intended to limit the protection scope of the present document. The present document can have a variety of other embodiments according to the content of the invention. Those skilled in the art can make the corresponding modifications and variations according to the present document without departing from the spirit and essence of the present document. All of modifications, equivalents and/or variations without departing from the spirit and essence of the present document should be included in the protection scope of the present document

INDUSTRIAL APPLICABILITY

For the network connection processing method after wakening the terminal on standby and the terminal provided in the above-mentioned embodiment, it is not required to send the data packet to the network ceaselessly during the standby peirod, which saves the flow rate of the user data, reduces the standby power consumption, and improves the standby time of the complete machine; at the moment of wakening up, it detects the connection state of the network voluntarily, and once it finds that the connection is disconnected, it immediately connects to the network before the standby again; in this way, it guarantees the user experience that the network connection is available and not disconnected under the standby state and reaches the effect that the network connection is immediately available after the complete machine is wakened up

What is claimed is:

1. A network connection processing method after wakening a terminal on standby, used in an application processor (AP) of the terminal, comprising: suspending, by the AP, a high-speed bus directly when the terminal will enter a standby state, and not sending an offline instruction to a baseband processor (BP) of the terminal;
  resuming, by the AP, the high-speed bus and inquiring a network connection state of the BP of the terminal when the terminal is wakened; and if the network connection state of the BP is connection, then continuing, by the AP, to use a wireless data link, otherwise, instructing, by the AP, the BP to re-establish a wireless data link.

2. The method according to claim 1, wherein, said inquiring the network connection state of the BP comprises: the AP sending an instruction of inquiring a networking state to the BP to obtain the network connection state of the BP.

3. The method according to claim 1, wherein, the step of instructing, by the AP the BP to re-establish the wireless data link comprises: sending, by the AP, a networking instruction to the BP to make the BP re-establishes the wireless data link according to a current network state of the BP.

4. A network connection processing method after wakening a terminal on standby, used in a baseband processor (BP) of the terminal, comprising:
  entering, by the BP, a standby state directly without notifying the network when the BP detects that a high-speed bus is suspended;
  entering, by the BP, a wakening state after the BP detects that the high-speed bus is resumed, and inquiring a network connection state of the BP after receiving an instruction of inquiring a networking state from an application processor (AP) of the terminal, and feeding back the network connection state of the BP to the AP; and
  re-establishing, by the BP, a wireless data link or maintaining a wireless data link of a current networking after receiving a networking instruction of the AP.

5. The method according to claim 4, wherein,
  re-establishing, by the BP, the wireless data link after receiving the networking instruction of the AP, comprises:
  re-establishing, by the BP, the wireless data link according to a current network state of the BP after receiving the networking instruction from the AP.

6. An application processor (AP) in a terminal, comprising:
  an application program control circuit: send a standby instruction to a high-speed bus host circuit when the terminal will enter a standby state, and send a resuming instruction to the high-speed bus host module when the terminal is wakened; inquire a network connection state of a baseband processor (BP) of the terminal; and if the network connection state of the BP is connection, then continue to use a wireless data link, otherwise, make the BP re-establish a wireless data link; the high-speed bus host circuit is configured to: suspend a high-speed bus after receiving the standby instruction, and not send an offline instruction to the BP of the terminal; and resume the high-speed bus after receiving the resuming instruction.

7. The AP according to claim 6, wherein,
  the application program control circuit is configured to: inquire the network connection state of the BP by the following way:
  sending an instruction of inquiring a networking state to the BP to obtain the network connection state of the BP.

8. The AP according to claim 6, wherein, the application program control circuit is configured to: make the BP re-establish the wireless data link by the following way:
  sending a networking instruction to the BP to make the BP re-establishes the wireless data link according to a current network state of the BP.

9. A baseband processor (BP) in a terminal, comprising:
  a high-speed bus device circuit, configured to: send a standby instruction to a standby control module after detecting that a high-speed bus is suspended; and send a resuming instruction to the standby control module after detecting that the high-speed bus is resumed;
  the standby control circuit, configured to: control the BP to enter a standby state directly without notifying the network after receiving the standby instruction; and control the BP to enter a wakening state after receiving the resuming instruction; and
  a networking control circuit, configured to: inquire a network connection state of the BP after receiving an instruction of inquiring a networking state from an application processor (AP) of the terminal, and feed back the network connection state of the BP to the AP; re-establish a wireless data link or maintaining a wireless data link of a current networking after receiving a networking instruction of the AP.

10. The BP according to claim 9, wherein,
the networking control circuit is configured to: re-establish the wireless data link after receiving the networking instruction of the AP by the following way:
re-establishing the wireless data link according to a current network state of the BP after receiving the networking instruction from the AP.

11. A terminal, comprising the application processor (AP) described in claim 6.

12. A terminal, comprising the baseband processor (BP) described in claim 9.

* * * * *